(12) United States Patent
Rausch et al.

(10) Patent No.: US 6,594,430 B1
(45) Date of Patent: Jul. 15, 2003

(54) SOLID IMMERSION LENSES FOR FOCUSING COLLIMATED LIGHT IN THE NEAR-FIELD REGION

(75) Inventors: Tim Rausch, Pittsburgh, PA (US); Tuviah E. Schlesinger, Mt. Lebanon, PA (US); Daniel D. Stancil, Mars, PA (US); James A. Bain, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 09/568,895

(22) Filed: May 11, 2000

(51) Int. Cl.⁷ .............................. G02B 6/10; G02B 6/32
(52) U.S. Cl. .......................... 385/129; 385/33; 359/717
(58) Field of Search .................... 385/33–35, 129–132; 359/642, 708–712, 717, 718, 716, 754

(56) References Cited

U.S. PATENT DOCUMENTS

| | | | |
|---|---|---|---|
| 4,400,748 A | 8/1983 | Bauck et al. | 360/99 |
| 4,419,704 A | 12/1983 | Radman et al. | 360/102 |
| 5,004,307 A | 4/1991 | Kino et al. | 359/356 |
| 5,012,463 A | 4/1991 | Farnsworth et al. | 369/100 |
| 5,121,256 A | 6/1992 | Corle et al. | 359/664 |
| 5,125,750 A | 6/1992 | Corle et al. | 359/819 |
| 5,199,090 A | 3/1993 | Bell | 385/33 |
| 5,497,359 A | 3/1996 | Mamin et al. | 369/44.15 |
| 5,881,042 A | 3/1999 | Knight | 369/99 |
| 5,917,788 A | 6/1999 | Mowry | 369/44.23 |
| 5,986,978 A | 11/1999 | Rottmayer et al. | 369/13 |
| 6,014,287 A | 1/2000 | Ehlers et al. | 360/102 |
| 6,023,378 A | 2/2000 | Schaenzer | 359/819 |
| 6,055,220 A | 4/2000 | Mamin et al. | 369/112 |
| 6,181,478 B1 | 1/2001 | Mandella | 359/642 |
| 6,236,513 B1 * | 5/2001 | Mallary | 359/642 |

FOREIGN PATENT DOCUMENTS

| | | |
|---|---|---|
| EP | 0 444 850 A2 | 9/1991 |
| EP | 0 953 075 A2 | 11/1999 |
| WO | WO 98/49675 | 11/1998 |
| WO | WO 99/50702 | 10/1999 |
| WO | WO 00/33298 | 6/2000 |

* cited by examiner

*Primary Examiner*—John D. Lee
*Assistant Examiner*—Sarah U Song
(74) *Attorney, Agent, or Firm*—Kirkpatrick & Lockhart LLP

(57) ABSTRACT

A lens for focusing collimated light. The lens includes a single, optically transmissive material having an aspherical focusing surface and a second surface, such that collimated light incident on the aspherical focusing surface is focused in a near-field region of the second surface.

15 Claims, 12 Drawing Sheets

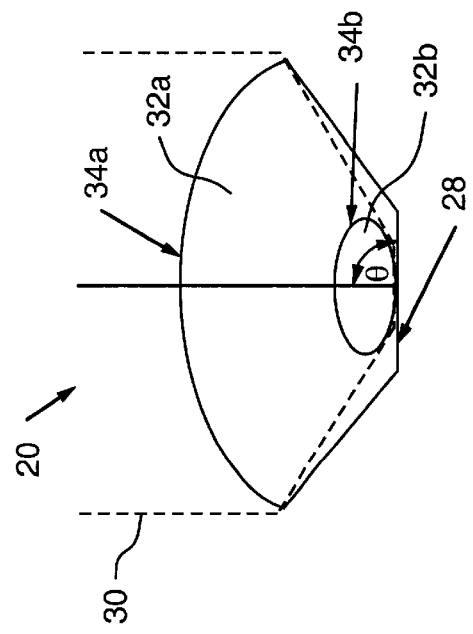
FIG. 6
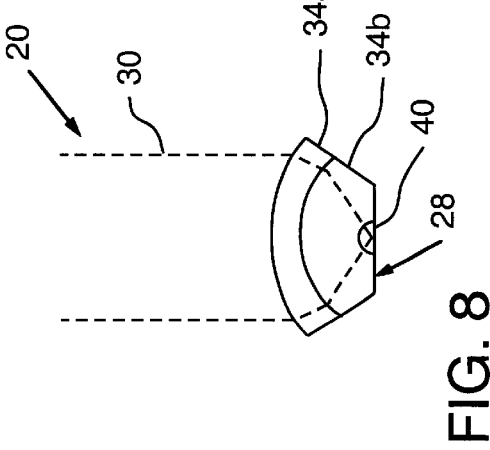
FIG. 8
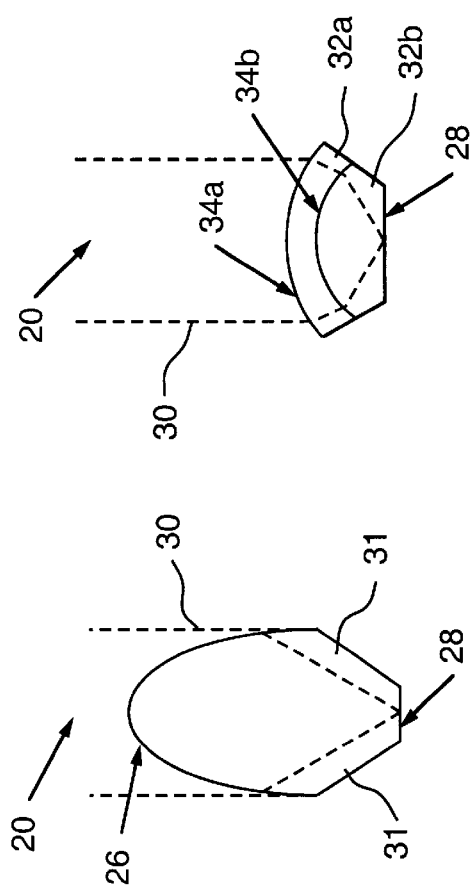
FIG. 5
FIG. 4
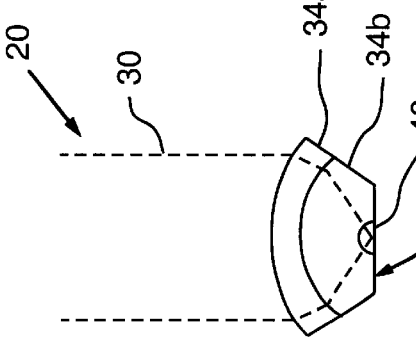
FIG. 7

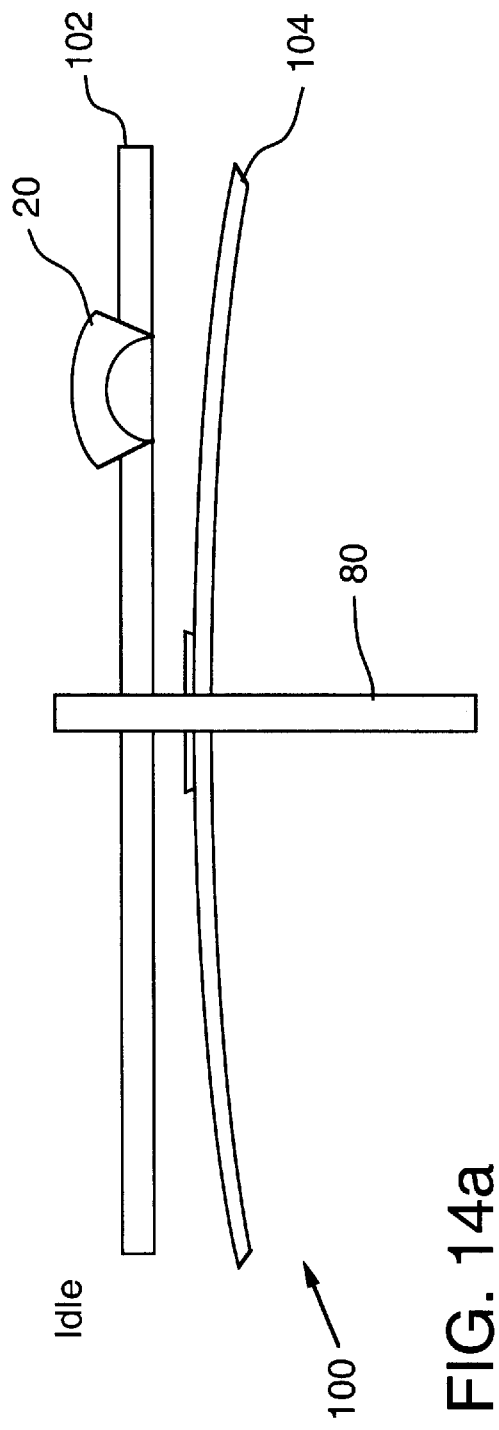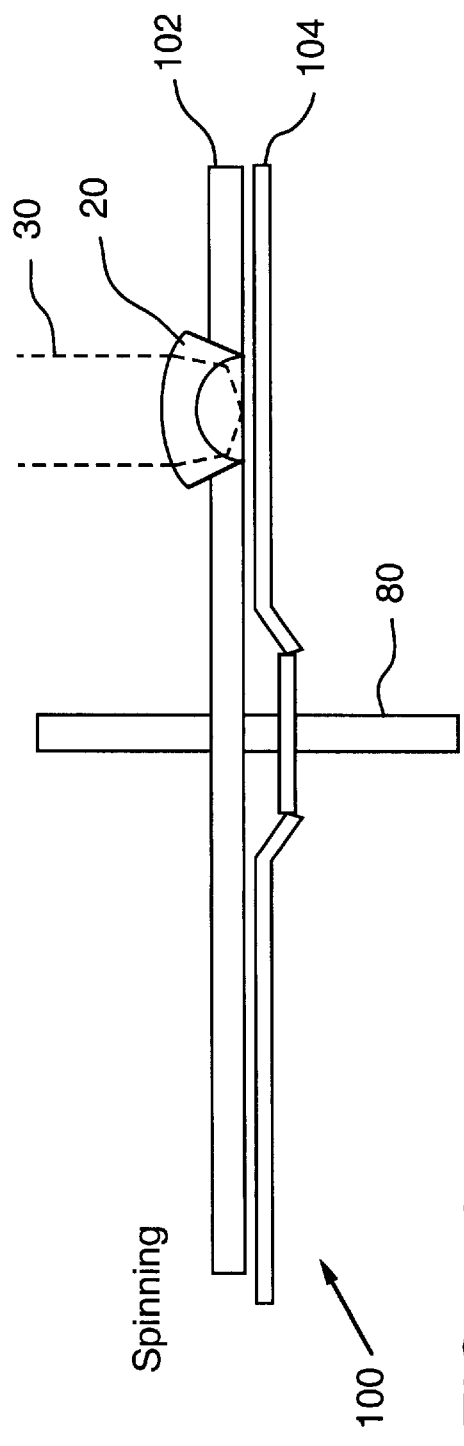

SOLID IMMERSION LENSES FOR FOCUSING COLLIMATED LIGHT IN THE NEAR-FIELD REGION

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF INVENTION

1. Field of Invention

The present invention relates generally to optics and, more particularly, solid immersion lenses for focusing collimated light in the near-field region.

2. Description of the Background

In modern optical data storage systems, data is stored on an optical storage medium in the form of marks carried on a surface of the optical medium. The data may be accessed by focusing a laser beam onto the data surface of the optical medium and analyzing the light reflected by the marks. Storage density of the system may be increased by reducing the size of the beam (called the "spot") focused on the data surface. In addition to optical data storage applications, reduction of spot size is beneficial for photolithography and microscopy applications as well. For example, in photolithography, smaller spot sizes allow for the exposure of finer features in photoresist.

The diffraction-limited spot diameter obtained from classical scalar diffraction theory is provided by:

$$d_{FWHM} = \frac{\lambda}{2NA} \quad (1)$$

where d is measured at the full width half maximum (FWHM), $\lambda$ is the wavelength of the light, and NA is the numerical aperture. The numerical aperture of a lens system, such as the lens system illustrated in FIG. 1, is an indication of the focusing power and may be approximated as:

$$NA \approx n_{medium2} \sin \theta \quad (2)$$

where the definition of the variables of equation 2 are provided with reference to FIG. 1. The numerical aperture of any lens system cannot exceed the value of the refractive index of the lens at the focal plane. Lenses are typically characterized by the value of the numerical aperture in air. For example, with reference to FIG. 1, if $\theta$ is 30°, and because $n_{medium2} \approx 1$(air), then $NA_{air} = 0.5$, and the diffraction limited spot size $d_{FWHM} \approx \lambda$. In optical data storage systems, as discussed hereinbefore, the size of a recorded bit, and hence the aerial density, is proportional to the spot size. From equation 1, it is evident that one way of reducing the diffraction limited spot size is to increase the numerical aperture.

One known lens system used in applications where reduced spot size is critical, such as optical data storage systems, involves using an objective lens 10 in conjunction with a solid immersion lens (SIL) 12, as illustrated in FIG. 2. Using the SIL 12 allows for the increase of the refractive index at the focal plane f of the objective lens 10. In FIG. 2, the surface 14 of the SIL 20 is hemispherical. Light from the objective lens 10 is incident normal to the upper surface 14 at all points, and no refraction at the upper surface 14 occurs. Therefore $\theta$, which is determined by the objective lens 10, will be unchanged and the refractive index of the media at the focal plane f is increased. Instead, the numerical aperture of the system of FIG. 1 is:

$$NA = n_{SIL} \sin \theta = n_{SIL} NA_{air}. \quad (3)$$

It is apparent from equation 1 that by using the SIL 12, the diffraction limited spot size is reduced by a factor of $n_{SIL}$. The optical spot may be evanescently coupled to an optical data storage medium with minor expansion provided that the medium is within the near-field region of the bottom surface 16 of the SIL 12, i.e., very close, typically within a fraction of a wavelength, or a few nanometers depending on the wavelength. The evanescent coupling effectively allows the small spot size to be "copied" across the gap from the bottom surface 16 of the SIL 12 to the media.

Another known type of lens system using an SIL 12, referred to as the "super SIL" or "SSIL", is shown in FIG. 3. For the lens system of FIG. 3, the surface 14 of the SSIL 12 is spherical. In addition, the focal plane f of the objective lens 10 is below the lower surface 16 of the SSIL 12. The SSIL 12 does some additional focusing of the light from the objective lens 10 and, when the incident angle of the light from the objective lens 10 on the SSIL 12 is 90°, $\theta'$ is also 90°. Therefore, $\sin \theta' = 1$, and the numerical aperture of the system is:

$$NA = n_{SIL}. \quad (4)$$

One restriction of the SSIL arrangement of FIG. 3 is that the numerical aperture of the objective lens 10 must be $1/n_{SIL}$ for maximum performance.

Additionally, to improve the off-axis performance or other aberrations caused by a hemispherical SIL, the lens system of FIG. 3 may use an aspheric SIL. A lens system using an aspheric SIL in conjunction with an objective lens to improve off-axis performance, however, may sacrifice spot size.

In all three of these cases, however, the objective lens 10 is separated from the SIL 12 by a spacing. In most near-field applications, the dimensions of the spacings are critical, and consequently must be accurate to within a fraction of a wavelength. Otherwise, if the focal plane deviates slightly from the designed location, the performance of the lens system is severely degraded. In addition, where the objective lens 10 and the SIL 12 are mechanically aligned, their alignment may shift, thereby possibly destroying the precise alignment.

Accordingly, there exists a need in the prior art for a lens system which yield a reduced spot size yet does not require precise mechanical alignment of the objective lens and the SIL. There further exists a need for such a lens system to be adaptable to modem near-field applications, such as optical data storage, photolithography, and microscopy.

BRIEF SUMMARY OF INVENTION

The present invention is directed to a lens for focusing collimated light. According to one embodiment, the lens includes a single, optically transmissive material having an aspherical focusing surface and a second surface, such that collimated light incident on the aspherical focusing surface is focused in a near-field region of the second surface.

According to another embodiment, the present invention is directed to a lens for focusing collimated light, including a first focusing portion having a first refractive index, wherein the first focusing portion includes a focusing surface and a second surface, and a second focusing portion having an aspherical focusing surface and a second surface, wherein the aspherical focusing surface of the second focusing portion is connected to the second surface of the first focusing portion, wherein the second focusing portion has a second refractive index which is not equal to the first refractive index, such that collimated light incident on the focusing surface of the first focusing portion is focused in a near-field region of the second surface of the second focusing portion.

According to another embodiment, the present invention is directed to a lens for focusing collimated light, including a first focusing portion having a first refractive index, wherein the first focusing surface includes a focusing surface and a second surface, a second focusing portion having first and second surfaces, wherein the first surface of the second focusing portion is connected to the second surface of the first focusing portion, wherein the second surface of the second focusing portion defines a cavity, and wherein the second focusing portion has a second refractive index which is not equal to the first refractive index, and a third optically transmissive portion disposed in the cavity defined by the second surface of the second focusing portion, wherein the third optically transmissive portion has a high refractive index relative to a wavelength of the collimated light.

The present invention provides an advantage over prior art lens systems for focusing collimated light in the near-field region in that it provides the focusing power of a solid immersion lens while obviating the need to employ a separate and distinct objective lens. Concomitantly, the present invention obviates the need to precisely orient the spacing between a separate and distinct objective lens and a solid immersion lens. In addition, the lenses of the present invention may be incorporated in, for example, optical data storage, photolithography, and microscopy systems, as well as in two-dimensional waveguide structures. These and other benefits of the present invention will be apparent from the detailed description of the invention hereinbelow.

DESCRIPTION OF THE FIGURES

For the present invention to be clearly understood and readily practiced, the present invention will be described in conjunction with the following figures, wherein:

FIGS. 4–8 are cross-sectional diagrams of a lens according to different embodiments of the present invention;

FIGS. 14a,b are combination schematic/block diagrams of an optical data storage system including a Bernoulli plate and a flexible optical data storage medium according to the present invention in the idle and spinning states respectively;

DETAILED DESCRIPTION OF THE INVENTION

Figure 1:
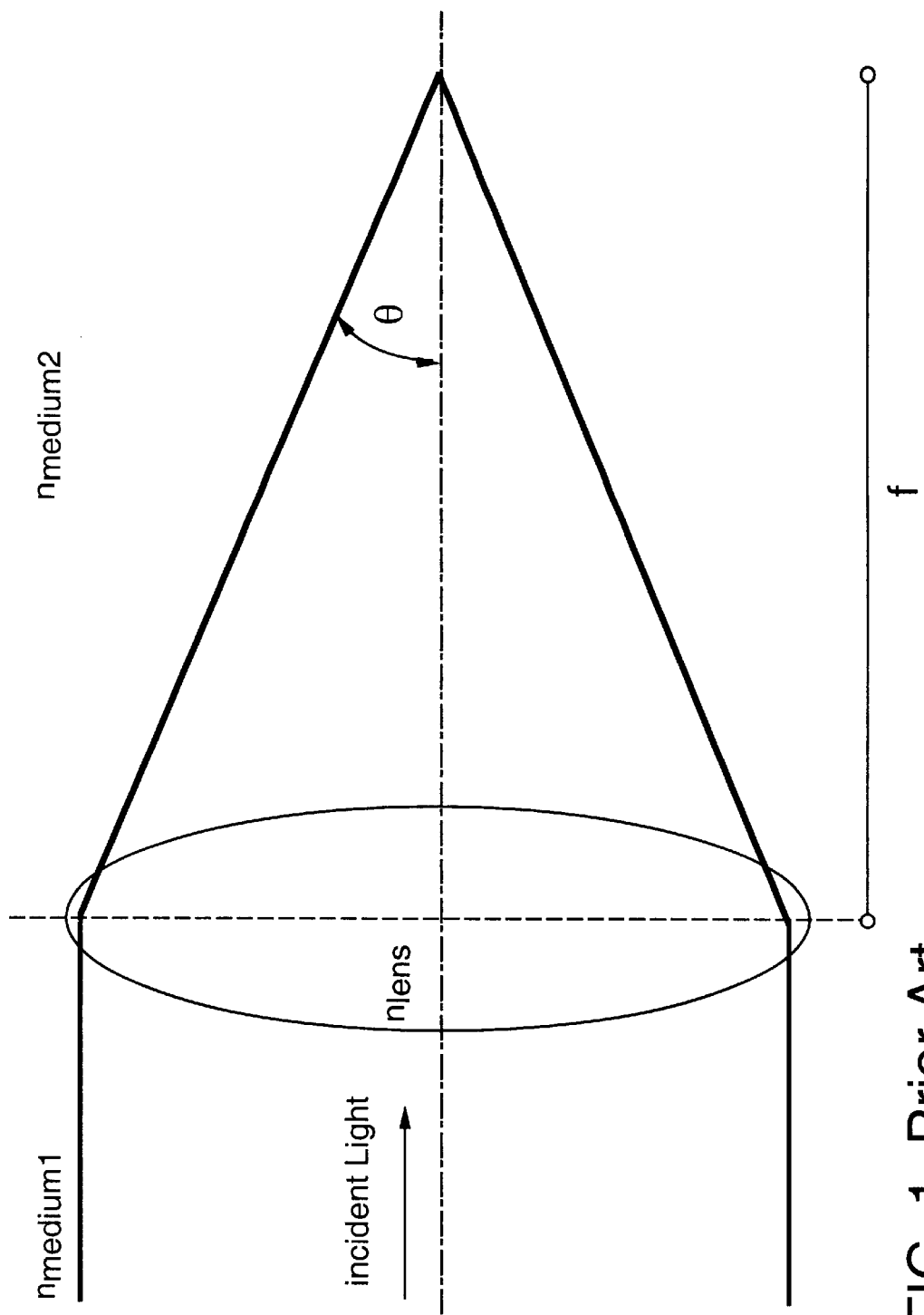
FIGS. 1–3 are cross-sectional diagrams of prior art lens systems.
Figure 3:
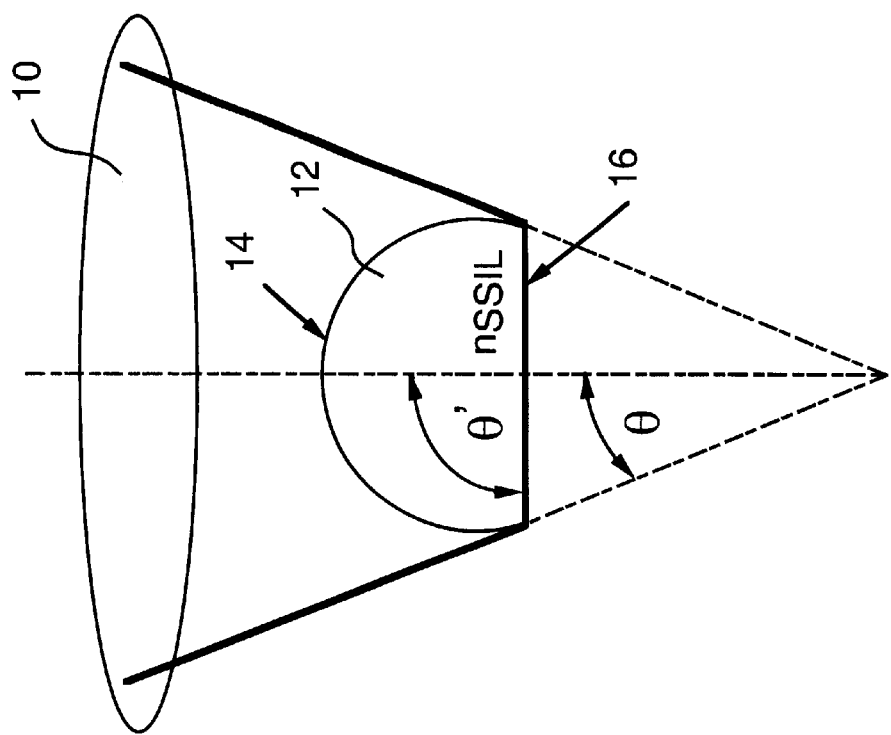
Figure 2:
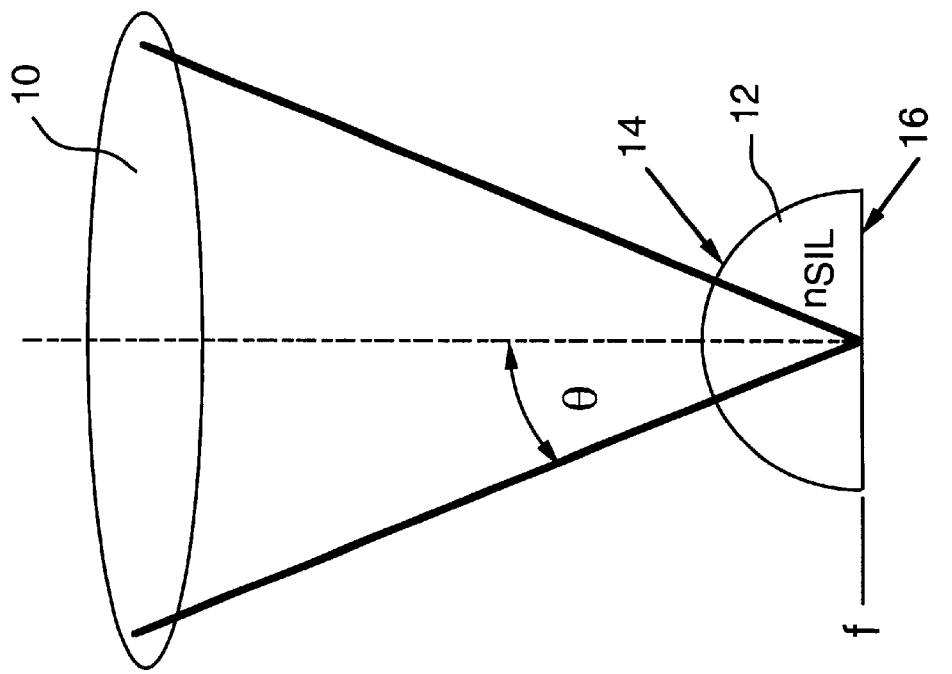

It is to be understood that the figures and descriptions of the present invention have been simplified to illustrate elements that are relevant for a clear understanding of the present invention, while eliminating, for purposes of clarity, other elements. For example, mechanical devices for providing translational movement for an air-bearing slider of an optical data storage system are not disclosed herein. Those of ordinary skill in the art, however, will recognize that these and other elements may be desirable. However, because such elements are well known in the art, and because they do not facilitate a better understanding of the present invention, a discussion of such elements is not provided herein.

FIG. 4 is a cross-sectional diagram of a lens 20 according to one embodiment of the present invention. The lens 20 is made of a single, optically transmissive material such as, for example, zinc sulfide or LaSF N9. The lens 20 includes a focusing surface 26 at which collimated light 30 may impinge on the lens 20. The focusing surface 26 may be, for example, aspheric in shape. The lens 20 may focus the incident collimated light 30, as shown in FIG. 4, in the near-field region of the lower surface 28 of the SIL portion 24. As used herein, the term "near-field region" or "near-field" refers to the area closest to the lower surface 28 of the lens 20 where the diffraction pattern differs substantially from that observed at an infinite distance. The focal spot of the lens 20 may be at the lower surface 28, just below the lower surface 28, or just above the lower surface 28, depending on the application.

The lens 20 may be fabricated using, for example, diamond-turning technology, which permits sufficiently accurate tolerances. Because the lens 20 focuses collimated light incident on the focusing surface 26 in the near-field region of the lower surface 28 of the lens 20, the lens 20 obviates the need for a separate and distinct objective lens. In addition, because the lens 20 may be fabricated from a single material, it is not a hybridized lens including separate and distinct objective and solid immersion lenses mounted together. Thus, the lens 20 of FIG. 4 may be referred to as an "integrated SIL" or "ISIL."

As can be seen in FIG. 4, the lens 20 may include non-focusing portions 31 which do not affect the operation of the lens 20 in focusing the collimated light 30. Accordingly, these non-focusing portions 31 may be shaped, for example, to facilitate incorporation of the lens 20 into a lens system. For example, the non-focusing portions 31 may be machined with accurate grooves to allow the lens 20 to be affixed to a microscope objective or to an air-bearing slider of an optical data storage system, as described further hereinbelow.

FIGS. 5 and 6 are cross-sectional diagrams of the lens 20 according to other embodiments of the present invention. The lens 20 of FIGS. 5 and 6 include first and second focusing portions 32a,b. The first and second focusing portions 32a,b may be, for example, bonded together using, for example, an epoxy or an index-matching adhesive. The focusing surfaces 34a,b may be, for example, hemispheric or aspheric in shape. The first and second focusing portions 32a,b may have different refractive indices. For example, the refractive index of the second focusing portion 32b may be greater than that of the first focusing portion 32a. By choosing the appropriate refractive index for each portion, a desired numerical aperture for the lenses 20 of FIGS. 5 and 6 may be realized. It should be noted that for the lens 20 of FIG. 6, θ equals 90°. Thus, referring to equation (3), NA=$n_{SIL}$ for this embodiment.

By using materials with different refractive indices, as in the lenses 20 of FIGS. 5 and 6, it is likely that the curvature for each of the focusing surfaces 34a of the first focusing portions 32a and the focusing surfaces 34b of the second focusing portions 32b need not be as drastic as the focusing surface 26 of the ISIL 20 of FIG. 4. Accordingly, the lenses 20 of FIGS. 5 and 6 may be easier to fabricate than the ISIL 20 of FIG. 4. In addition, the lenses 20 of FIGS. 5 and 6 may provide a higher numerical aperture than the ISIL 20 of FIG. 4.

According to other embodiments of the present invention, the lens 20 may include more than two focusing portions, such as illustrated in FIG. 7, wherein each focusing portion 32a–c includes a material of a different refractive index. The focusing surfaces 34a–c of each of the focusing portions 32a–c may be, for example, hemispherical or aspherical in shape. Generally, the more focusing portions 32 that are included in the lens 20, the less severe the focusing surfaces 34 of the focusing portions 32 need to be.

According to another embodiment, the ISIL 20 of FIG. 4 may fabricated from a GRIN (Gradient Refractive INdex) optical material. A GRIN optical material is an optically transmissive material whose material refractive index varies continuously as a function of spatial coordinates in the medium. For such an embodiment, the ISIL 20 may effectively function as the lens 20 of FIG. 7 having an infinite number of focusing portions 34. According to other embodiments, the ISIL 20 of FIG. 4 may be fabricated from a birefringent optical material or an electro-optic material.

Figure 9A:
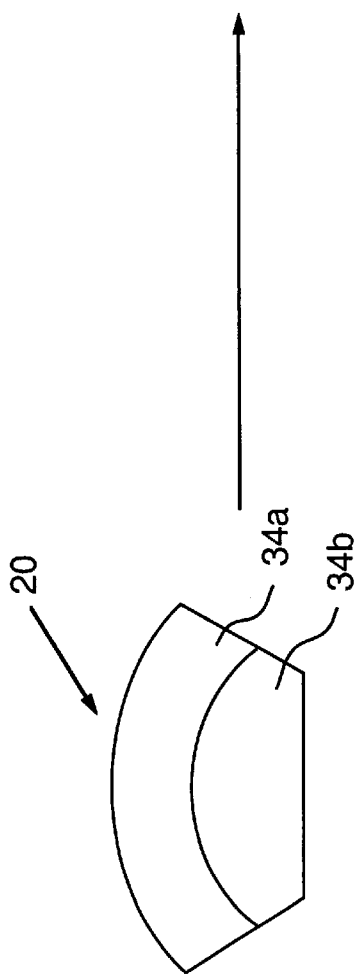
FIGS. 9a–9d are diagrams illustrating a method of fabricating the lens of FIG. 8 according to one embodiment of the present invention.
Figure 9B:
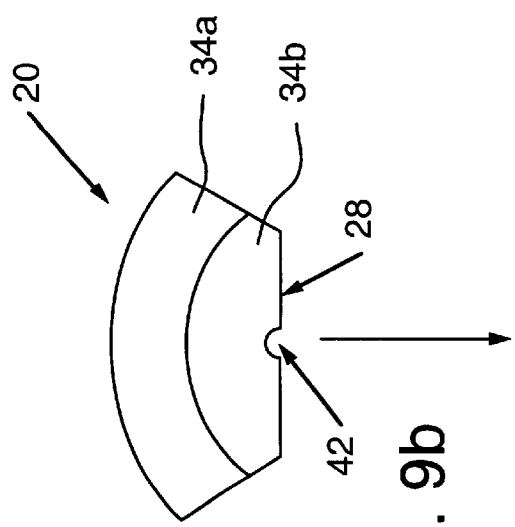
Figure 9C:
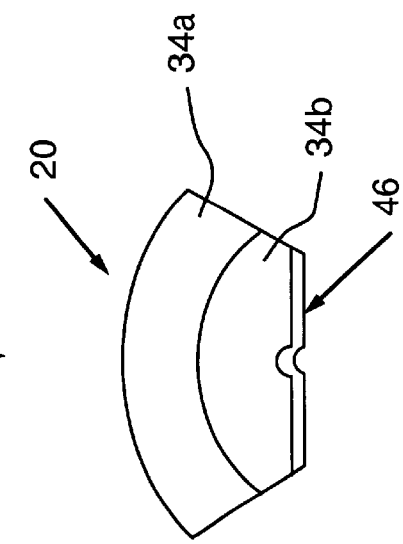
Figure 9D:
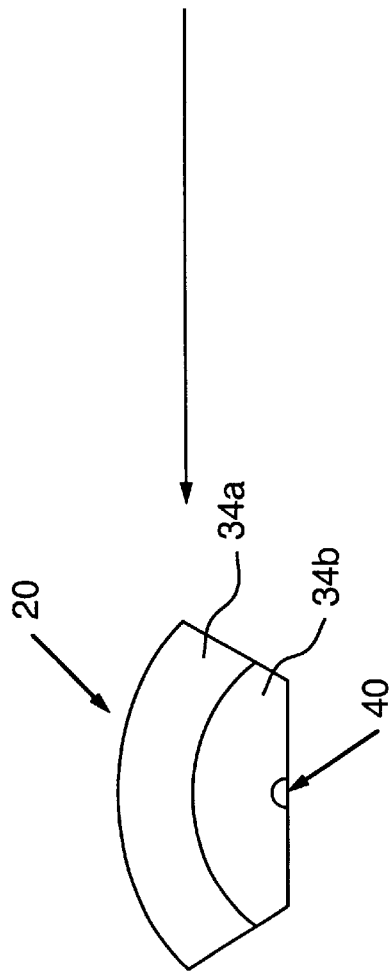

FIG. 8 is a cross-sectional diagram of the lens 20 according to another embodiment of the present invention. The lens 20 of FIG. 8 is similar to that of FIG. 5, but also includes a high refractive index portion 40 (relative to the wavelength of the incident collimated light 30) disposed within a cavity formed in the lower surface 28 of the SIL portion 24. The high refractive index portion 40 may be, for example, hemispherical or aspherical in shape. The lens 20 of FIG. 8 may be fabricated, for example, by the method illustrated in FIGS. 9a–d. According to such an embodiment, the method may include forming a small cavity 42 in the lower surface 28 of the SIL portion 24, as illustrated in FIG. 9b. The cavity 42 may be formed, for example, by diamond turning, as is known in the art. Next, as illustrated in FIG. 9c, a layer 46 of the material comprising the high refractive index portion 40 may be deposited on the lower surface 28 of the SIL portion 24. The layer 46 may be formed using, for example, any film deposition technique including, for example, sputtering, CVD deposition, etc. The excess portions of the layer 46 may then be removed, as illustrated in FIG. 9d, by, for example, polishing or planarizing. The lens 20 may then be finished to yield the final product, as illustrated in FIG. 8, wherein the high refractive index portion 40 is disposed within the cavity 42 formed in the lower surface 28 of the SIL portion 24.

With the lens 20 of FIG. 8, the thickness of the high refractive index portion 40 may be very short compared to the other focusing portions 32a–b. For example, the optical thickness of the high refractive index portion 40 may be on the order of one hundred wavelengths, and according to one embodiment, may be on the order of ten wavelengths, which may correspond to a thickness of a few microns. In addition, by using thin film deposition techniques, the material comprising the high refractive index portion 40 may be, for example, a high index material that may not otherwise be used in the manufacturing of conventional lenses, such as a material having a refractive index greater than 2.6, and more specifically above 2.8, relative to the wavelength of the collimated light 30. In addition, the high refractive index portion 40 may be of a material that is not normally transparent to certain portions of the light spectrum, such as blue light (λ=488 nm), because given that the thickness of the high refractive index portion 40 may be only a few wavelengths, the attenuation will be negligible. The material comprising the high refractive index portion 40 may be, for example, gallium phosphide, tellurium oxide, gallium nitride, and zinc oxide.

Although the lens of FIG. 8 is depicted as having only two other focusing layers 32a–b, it should be noted that the lens 20 of FIG. 8 may also be incorporated in a lens having more than two focusing portions 32, such as the lens 20 illustrated in FIG. 7, or in an ISIL embodiment, as illustrated in FIG. 4.

The lenses 20 of FIGS. 4–8 may also be used in conjunction with an objective lens, as discussed hereinbelow with respect to FIG. 17.

Figure 10:
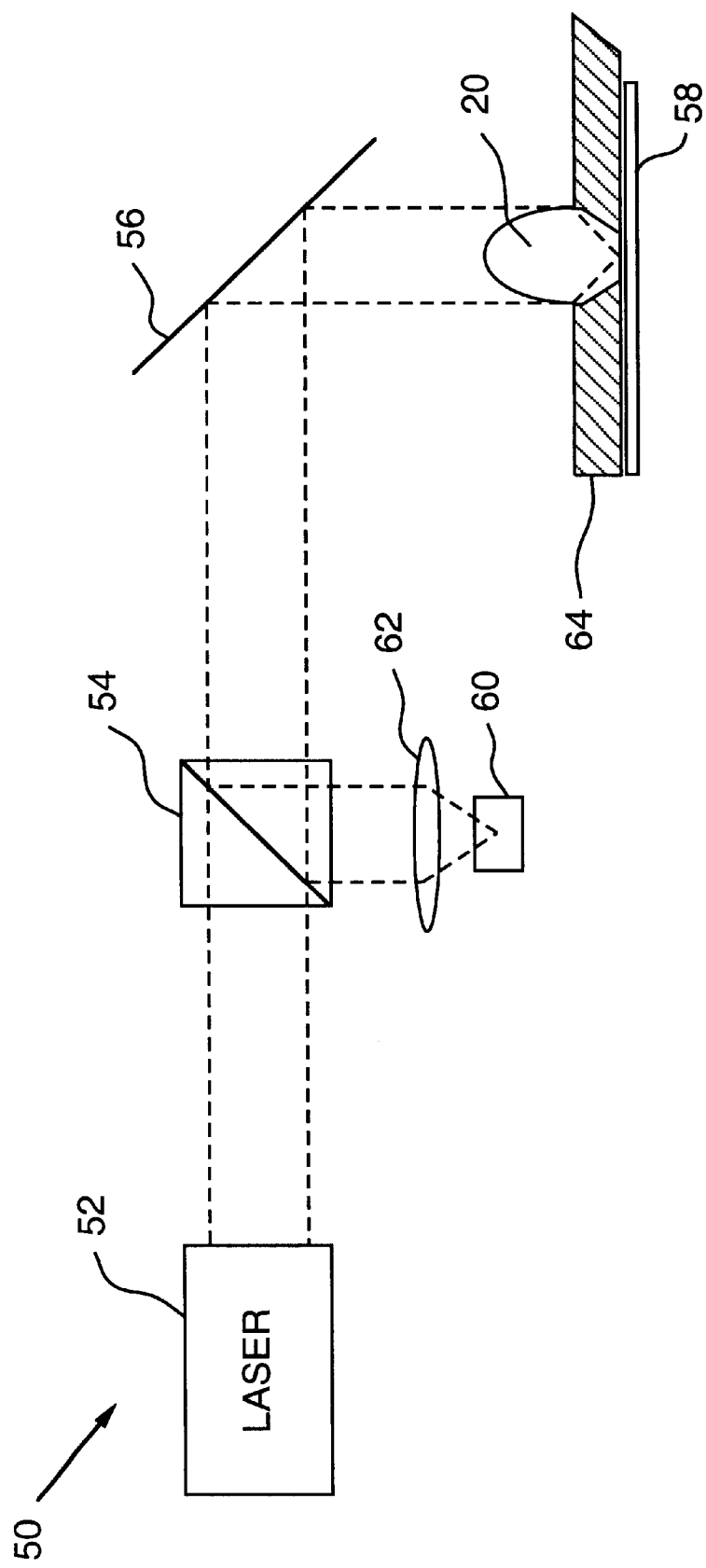
FIG. 10 is a combination schematic/block diagram of an optical data storage system according to one embodiment of the present invention.

FIG. 10 is a block diagram of an optical data storage system 50 incorporating the lens 20 of the present invention. The lens 20 may be an ISIL, as described hereinbefore with respect to FIG. 4, or it may be a lens including multiple focusing portions 34, as described hereinbefore with respect to FIGS. 5–8. Light from a laser 52 passes through a beam splitter 54 and is reflected to the lens 20 by a mirror 56. The lens 20 focuses the light reflected by the mirror 56, and the focused spot is coupled to the optical data storage medium 58 by evanescent fields. For an embodiment in which the medium 58 is a phase change medium, a recorded mark on the medium 58 may be written or erased depending on the power of the laser 52. If the medium 58 is magneto-optical, an external magnet (not shown) may be used to change the magnetization of the medium 58 within a thermal gradient defined by the focused spot. With the system 50, the reading of data stored on the medium 58 may be accomplished using reflected light from the medium 58 and a detector 60 that either measures the Kerr rotation of a magneto-optical medium 58 or the change in intensity of a phase change medium 58. Light from the beam splitter 54 may be focused on the detector 60 by a lens 62.

The system 50 may be used for a near-field optical data storage application. Consequently, the spacing between the bottom surface 28 of the lens 20 and the medium 58 may be on the order of a fraction of a wavelength. This may be accomplished by using an air-bearing slider 64, as is known in the art. The slider 64 may include an opening in which the lens 20 may be disposed such that it is in close proximity with the medium 58.

Figure 11A:
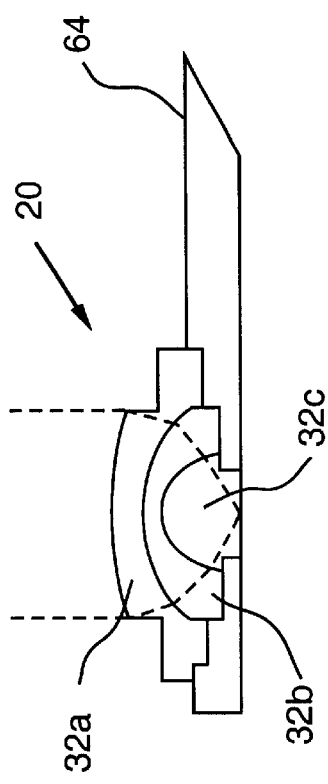
FIGS. 11a–d are cross-sectional diagrams of different embodiments of a combination of a lens and an air-bearing slider according to the present invention.
Figure 11B:
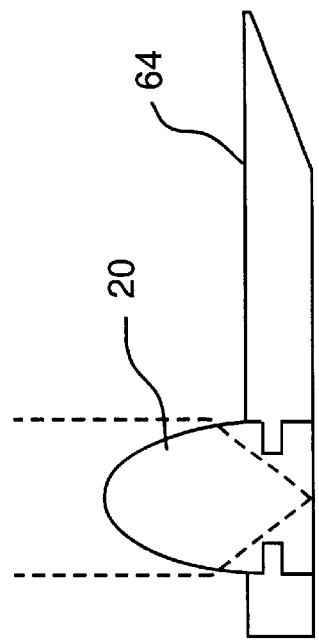
Figure 11C:
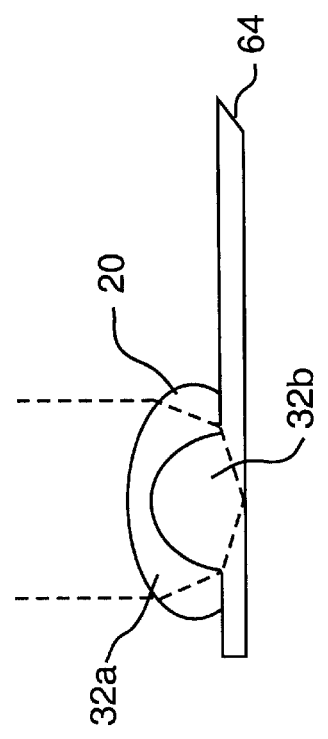
Figure 11D:
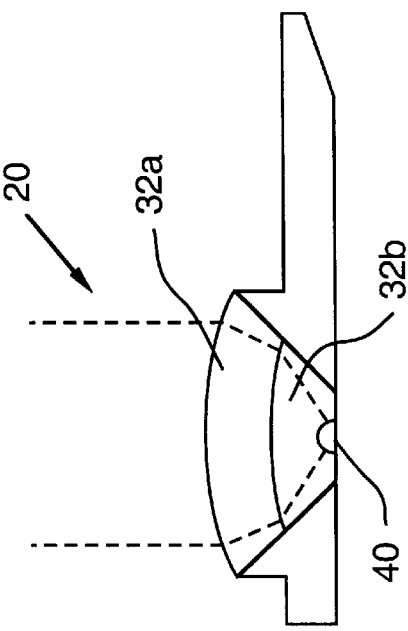

FIGS. 11a–d provide different embodiments of how a lens 20 of the present invention may be connected to an air bearing slider 64 for the system 50. For the embodiment of FIG. 11a, the lens 20 is similar to the lens of FIG. 5, and the slider 64 is fabricated with an optically transmissive material. That is, the non-focusing portions 31 of the lens 20 (see FIG. 4) may form the slider 64. In FIG. 11b, the lens 20 is similar to the lens 20 of FIG. 7, including three focusing portions 34. For such an embodiment, the slider 64 need not be fabricated from an optically transmissive material. In FIG. 11c, the lens 20 is similar to the lens 20 of FIG. 8, including the high refractive index portion 40 disposed in a cavity in the bottom surface of the focusing portion 32b. For such an embodiment, the slider 64 need not be fabricated from an optically transmissive material. In FIG. 11d, the lens 20 is an ISIL, as described hereinbefore with respect to FIG. 4. Again, for such an embodiment, the slider 64 need not be fabricated from an optically transmissive material. In addition, as illustrated in FIG. 11d, the non-focusing portions 31 of the lens 20 may be machined to provide an effective manner in which to connect the lens 20 to the slider 64.

Figure 12:
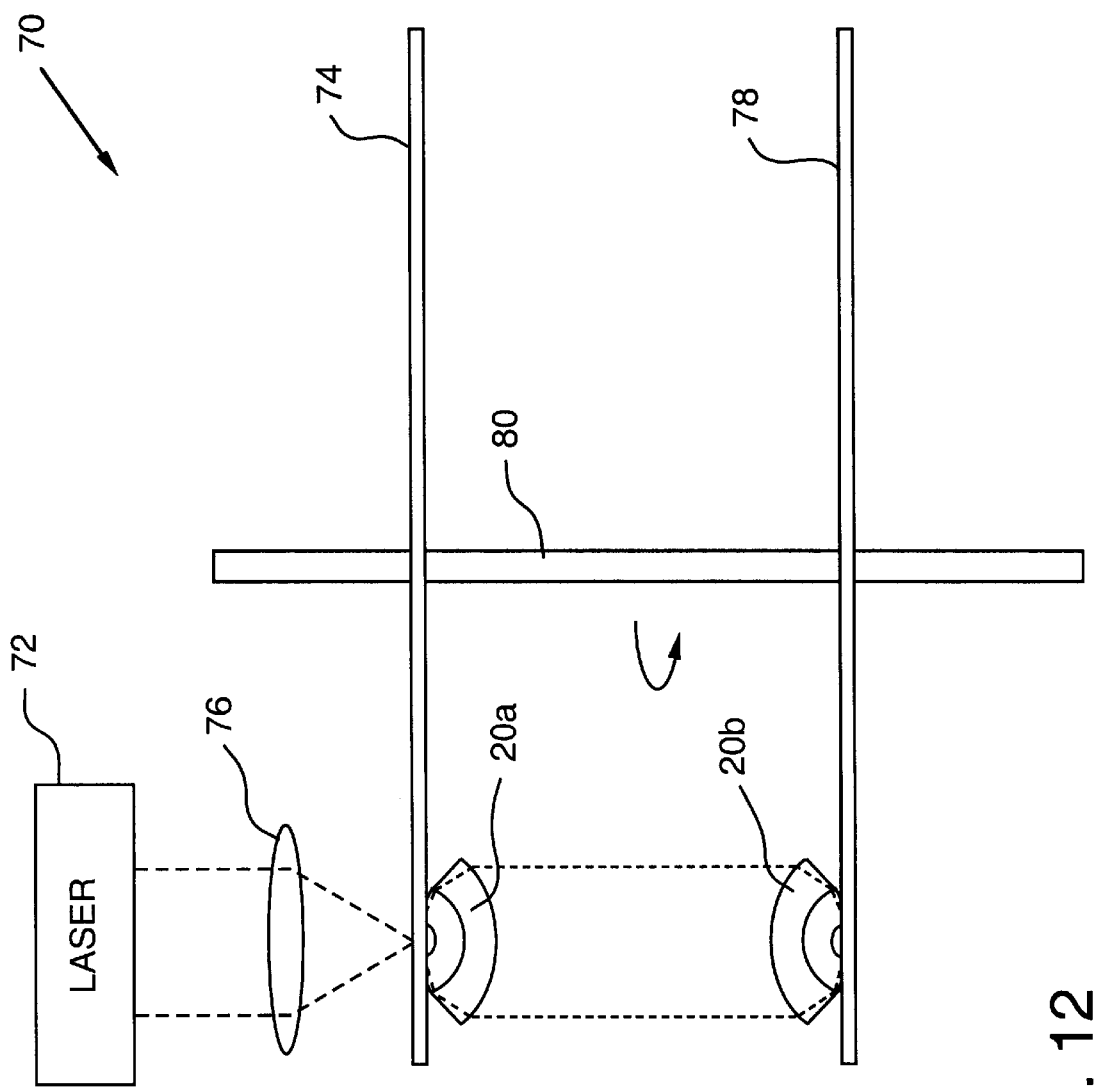
FIG. 12 is a combination schematic/block diagram of a photolithography system according to one embodiment of the present invention.

FIG. 12 is a combination block/schematic diagram of a photolithography system 70 incorporating lenses 20a,b according to the present invention. Each of the lenses 20a,b shown in FIG. 12 are similar to the lens 20 shown in FIG. 8, although it should be recognized that, for example, an ISIL 20, such as shown in FIG. 4, or a lens 20 including multiple focusing portions 40, such as shown in FIGS. 5–7, or a combination thereof, may also be used in the system 70. With the system 70 of FIG. 12, light from a laser 72 is focused on a mask 74 containing a pattern, as is known in the art, by a lens 76 placed between the laser 72 and the mask 74. A first lens 20a according to the present invention, positioned at the bottom of the mask 74, captures any light that passes through the patterned openings in the mask 74. A second lens 20b according to the present invention focuses the light from the first lens 20a onto a substrate 78 positioned in the near-field region of the second lens 20b. The system 70 may be used, for example, to expose photoresist on the substrate 78. The spot from the second lens 20b is evanescently coupled to the substrate 78, and exposes the photoresist at that location. A spindle 80 may be used to rotate the substrate 78, as is known in the art, to expose photoresist at different locations on the substrate 78.

Figure 13:
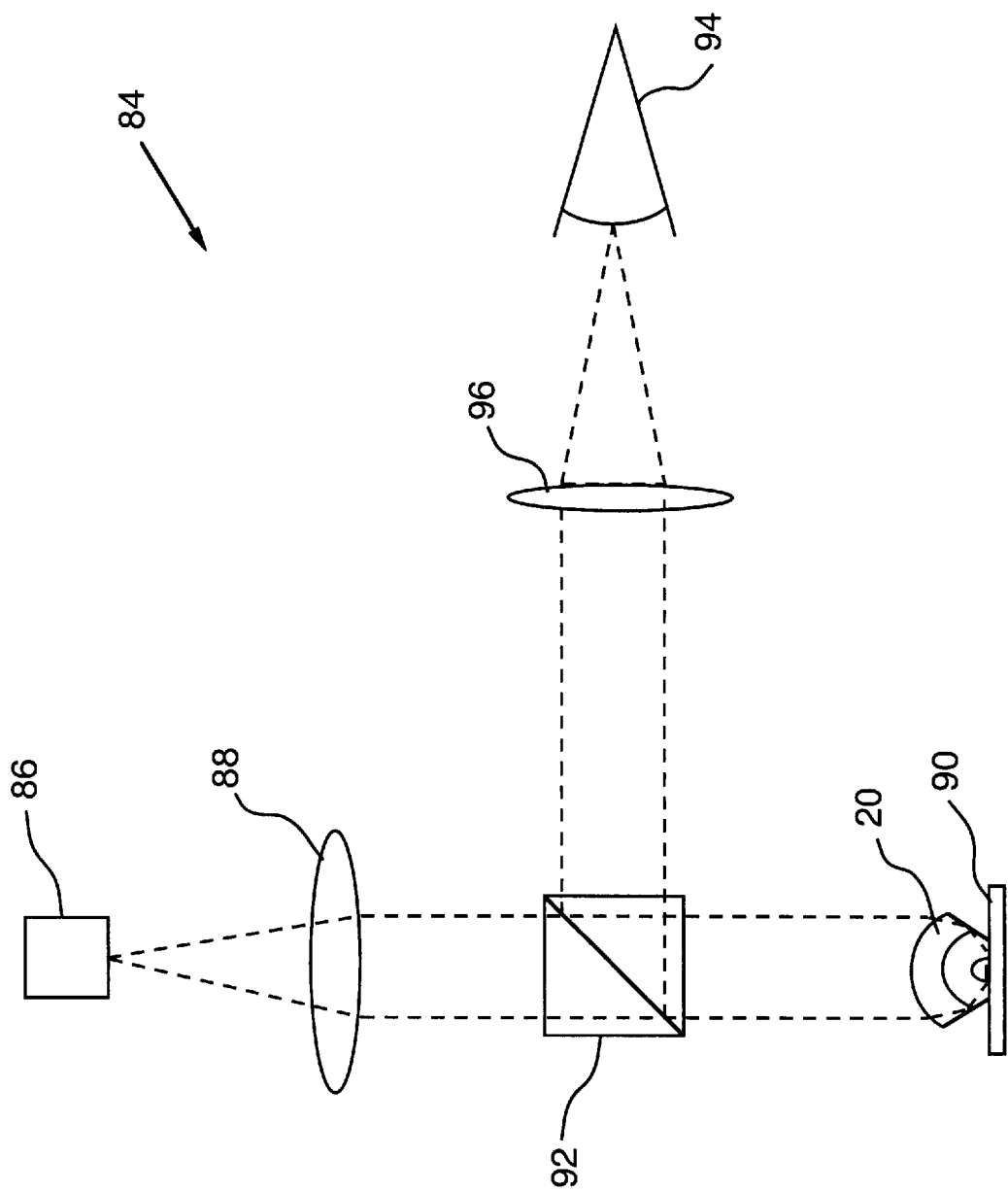
FIG. 13 is a combination schematic/block diagram of a microscopy system according to one embodiment of the present invention.

FIG. 13 is a combination block/schematic diagram of a near-field microscopy system 84 incorporating the lens 20 of the present invention. The lens 20 shown in FIG. 13 is similar to the lens 20 shown in FIG. 8, although it should be recognized that, for example, an ISIL 20, such as shown in FIG. 4, or a lens 20 including multiple focusing portions 32, such as shown in FIGS. 5–7, may also be used in the system 84. With the microscopy system 84, light from a light source 86 is collimated by condenser lens 88 and focused onto a specimen 90 located in the near-field region of the lens 20. A beam splitter 92 positioned between the condenser lens 88 and the lens 20 is used to direct light reflected by the specimen 90 to an observer 94 through a lens 96.

FIGS. 14a and 14b are diagrams of an optical data storage system 100 including a Bernoulli plate 102 and a flexible optical data storage medium 104. The Bernoulli plate 102 includes a translationally moveable opening in which the lens 20 of the present invention is disposed. FIG. 14a shows the orientation between the Bernoulli plate 102 and the flexible medium 104 when the flexible medium 104 is idle. FIG. 14b shows the orientation between the Bernoulli plate 102 and the flexible medium 104 when the flexible medium 104 is spinning. Rotation of the flexible medium 104 may be caused by the rotation of the spindle 80, as is known in the art. As can been seen in FIG. 14b, when the flexible medium 104 is spinning, it is drawn within the near-field region of the lens 20 positioned on the Bernoulli plate 102 because of the Bernoulli effect. The focus spot of the lens 20 may be evanescently coupled to the flexible medium 104 to write data to or read data from the medium 104. The lens 20 shown in FIGS. 14a, 14b is similar to the lens 20 of FIG. 5, although according to other embodiments, the lens 20 of the system 100 may be an ISIL 20, as illustrated in FIG. 4, or a lens 20 including multiple focusing portions 34, as illustrated in FIGS. 6–8.

Figure 15:
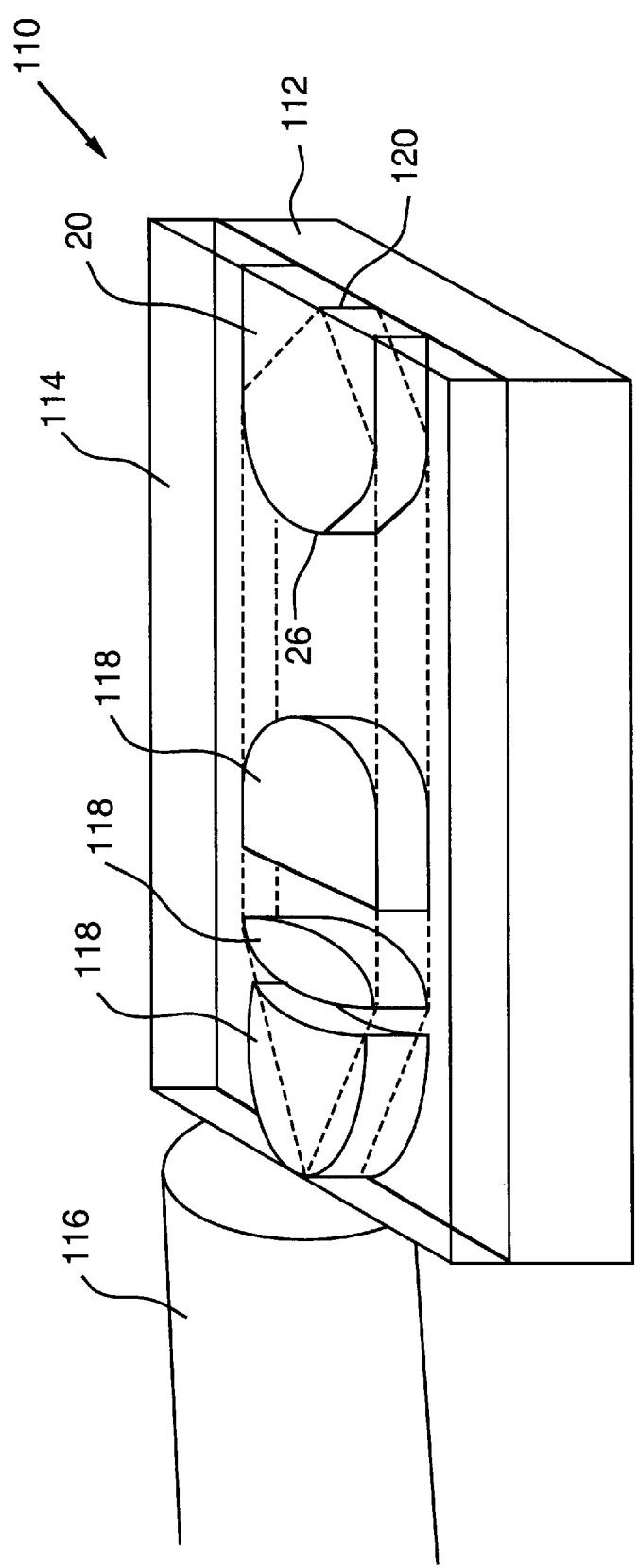
FIG. 15 is a perspective-view of an optical waveguide according to one embodiment of the present invention.

FIG. 15 is a perspective view of an optical waveguide 110 incorporating the lens 20 of the present invention. The waveguide 110 includes a lower cladding layer 112 defining an optical channel 114 within the waveguide 110. The waveguide 100 may further include an upper cladding layer (not shown) to define the upper boundaries of the optical channel 114. The optical channel 114 is comprised of an optically transmissive material with a refractive index higher than that of the cladding layers. Optical energy may be input to the channel 114 from, for example, an optical fiber 116. According to other embodiments, optical energy may be input to the channel 114 from, for example, a laser diode or a prism coupler.

Disposed within the optical channel 114 of the waveguide 110 is a collimating optics system 118 and the lens 20 of the present invention. The collimating optical system 118 and the lens 20 may be two-dimensional optical elements. The collimating optical system 18 and the lens 20 may be mode-index waveguide lenses, wherein their refractive indices of the optical elements may be changed by varying the thickness of the optical layer 114 or varying the materials. The lens 20 shown in FIG. 15 is a two-dimensional version of the ISIL 20 of FIG. 4, although according to other embodiments, the lens 20 of FIG. 15 may be a two-dimensional version of the lenses 20 of FIGS. 5–8, including multiple focusing layers 32. Light from the optical fiber 116 is collimated by the collimating optics system 118. The collimated light produced by the collimating optics system 118 is incident on the focusing surface 26 of the lens 20, and focused in the near-field region of the lower surface 28 of the lens 20 to produce a two-dimensional diffraction limited spot 120. According to other embodiments of the present invention, the collimating optics system 118 may be eliminated where, for example, the light input to the optical channel is already collimated.

Figure 16:
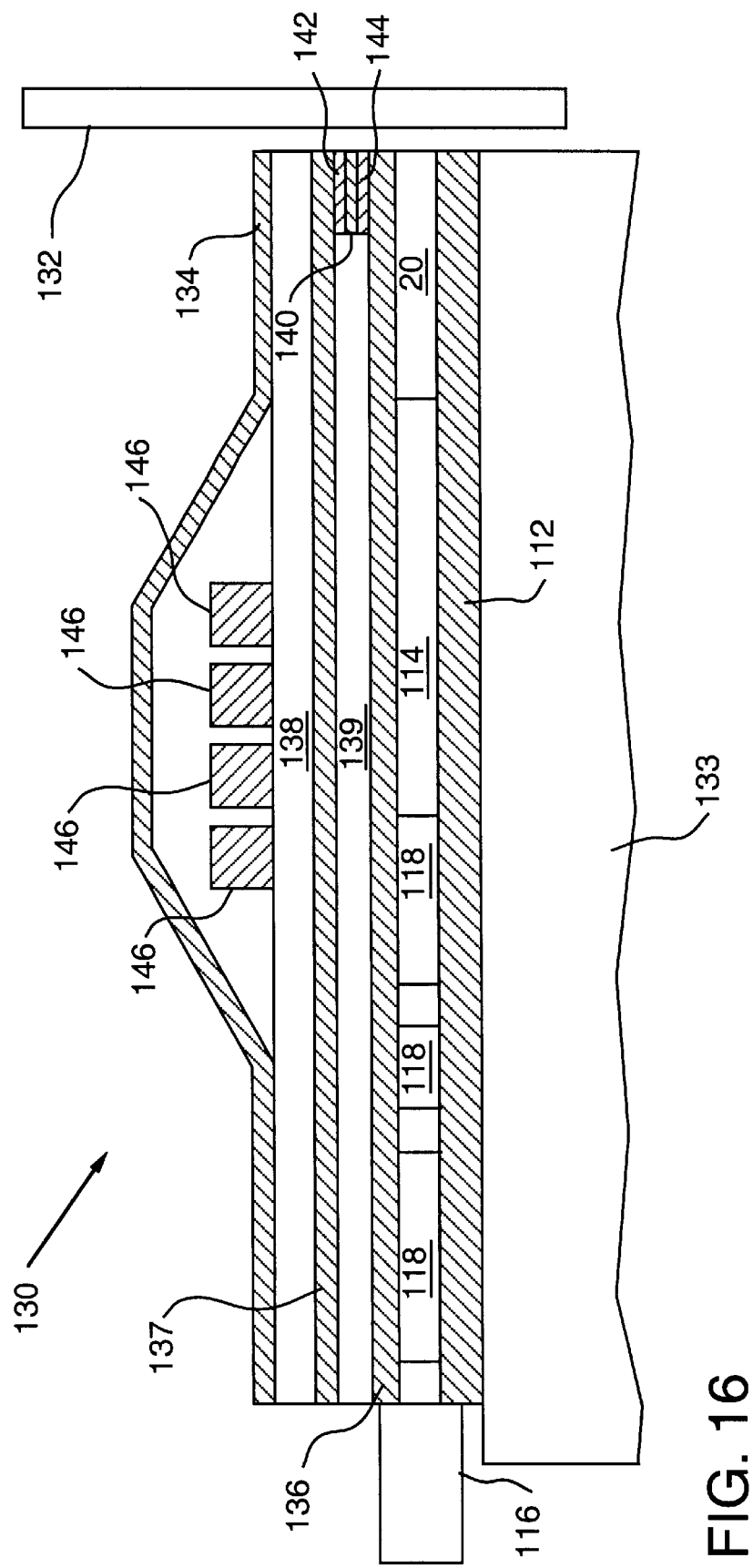
FIG. 16 is a cross-sectional side-view diagram of a read/write head of a magneto-optical data storage system according to one embodiment of the present invention.

FIG. 16 is a cross-sectional diagram of a read/write head 130 including a lens 20 according to the present invention. The read/write head 130 may be used for magnetic reading of data from and magneto-optical (MO) writing of data to a magneto-optical data storage medium 132, as further described in U.S. Pat. No. 5,986,978, entitled "Read/Write Head and Method For Magnetic Reading and Magneto-Optical Writing On A Data Storage Medium," which is incorporated herein by reference. The head 130 may move relative to the medium 132 by means of an air-bearing slider 133, as is known in the art. The read/write head 130 includes a pole 134, which may be fabricated from an electrically and magnetically conductive material such as, for example, a nickel-iron composition or another ferromagnetic composition. The head 130 also includes a waveguide structure such as, for example, the optical waveguide 110 of FIG. 15, including a lower cladding layer 112, an optical channel 114, and an upper cladding layer 136. Disposed with the optical channel 114 may be the collimating optics system 118 and the lens 20 of the present invention, as discussed hereinbefore with respect to FIG. 15.

The head 130 may include three magnetic layers: the pole 134, a shared shield layer 137, and the upper cladding layer 136 of the waveguide. The magnetic layers may be separated from each other by insulating layers 138, 139, which may be, for example, aluminum oxide or silicon nitride. The head 130 may also include a magnetoresistive (MR) sensor 140 such as, for example, a giant magnetoresistive (GMR) sensor. First and second contact elements 142, 144 may be formed over the MR sensor 140. The first and second contact 142, 144 may be fabricated from an electrically conductive and magnetically non-conductive material such as, for example, copper, gold, aluminum, or alloys of these metals. A read circuit (not shown), having terminals connected to the first and second contact elements 142, 144, may send a sensing electric current through the MR sensor 140 to magnetically read data from the medium 132.

The head 130 may also include a write coil 146 having a number of turns. As illustrated in FIG. 16, the write coil 146 may be provided adjacent to the insulating layer 138. A write circuit (not shown), having terminals connected to turns of the coil 146, sends an electrical current through the write coil 146 to induce a magnetic flux-field in the vicinity of the medium 132. In the write mode, the lens 20 may be used to focus light from the optical fiber 116 to heat an MO data layer of the medium 132 in a near-field region of the lens 20 to a sufficient temperature (i.e., close to the Curie temperature of the medium 132) in order to write and erase data. As the critical temperature is reached, the magnetic field strength in the MO data layer of the medium 132 is greatly reduced. The external magnetic field generated by the write coil 146 is used to reverse the field of the magnetic domain of the MO data layer of the medium 132, as desired, to record a binary digit. Data may be recorded by orienting the magnetization of the magnetic domain of the MO data layer of the medium in either an up or down direction.

The data may be read by measuring the change in the resistance of the MR sensor 140, as discussed hereinbefore. The optical waveguide 110 may also be used to heat the medium 132 when reading the data to increase the magnetization of the MO data layer of the medium 132. When reading data, the MO data layer may be heated to a temperature between room temperature and less than the Curie temperature of the medium 132. If the medium 132 is heated too much, however, the data may be erased instead, thus preventing reading of the data.

Using the lens 20 of the present invention permits a smaller portion of the medium 132 to be heated to the critical temperature, thereby increasing the storage capacity of the medium 132. In addition, because the track width is defined thermally by the waveguide 110, the present invention permits wider heads 130 to be utilized, thus obviating the need to use focused ion beam or x-ray lithography to fabricate the head 130. Further, because the medium 132 is heated to reduce the coercive field, media with a high room temperature coercivity may be used, which translates to smaller switching volumes.

In FIG. 16, the lens 20 is illustrated as being a two-dimensional version of the ISIL 20 of FIG. 4, although according to other embodiments, the lens 20 of the head 130 of FIG. 15 may be a two-dimensional version of the lenses 20 of FIGS. 5–8, including multiple focusing layers 34.

Although the read/write head 130 of the present invention was described hereinbefore as being used to read and write data to a MO data layer, it should be recognized that benefits of the present invention may be realized for other types of recording media where the coercivity of the data layer is reduced as a result of heating the data layer with thermal energy. Further, although MO is a perpendicular recording medium, benefits of the present invention may also be realized with, for example, longitudinal recording media. Moreover, although the MR sensor geometry shown in FIG. 16 corresponds to a CPP (current perpendicular to plane) geometry, benefits of the present invention may also be realized with, for example, a CIP (current in plane) MR sensor geometry.

Figure 17:
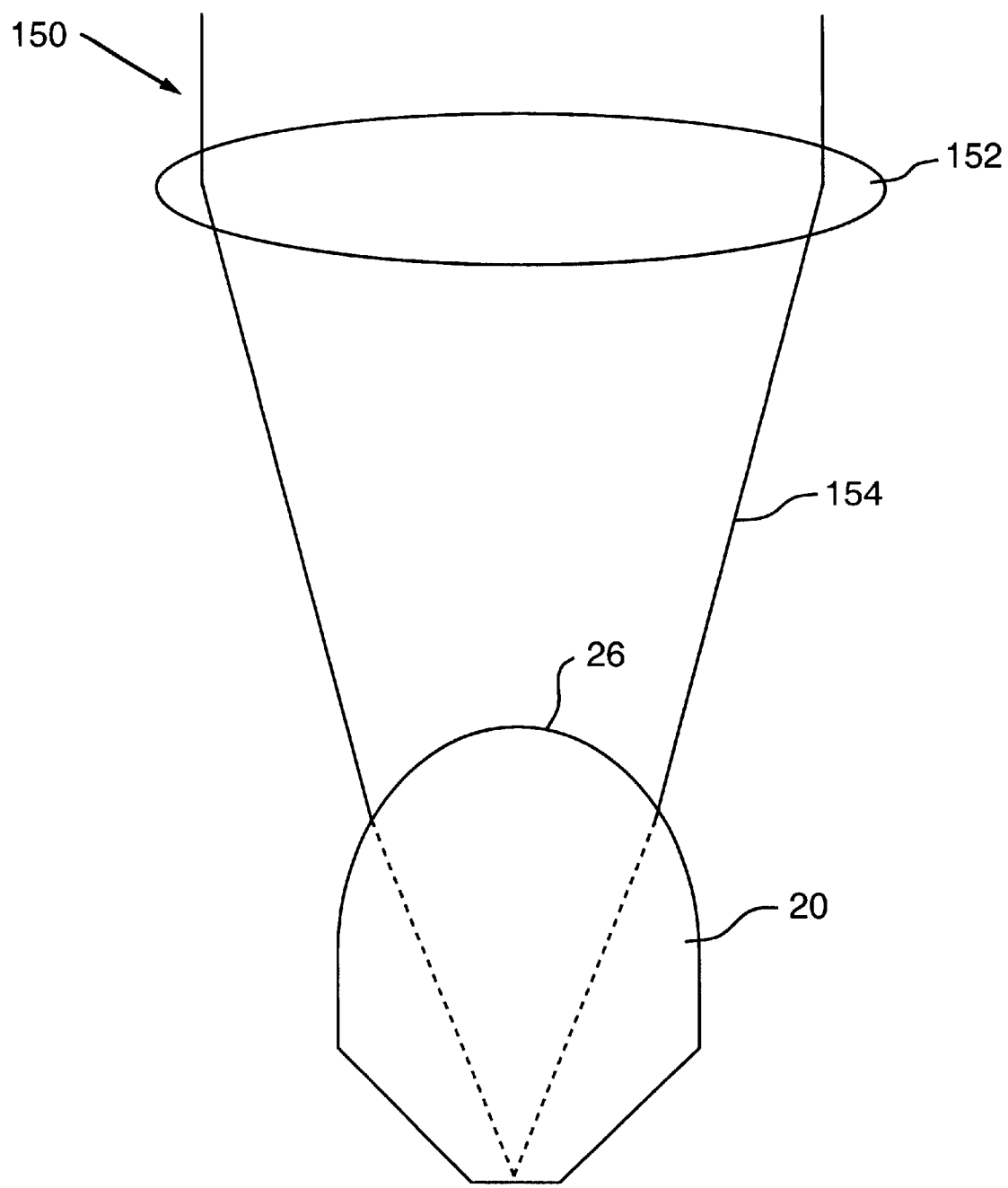
FIG. 17 is a diagram of a lens system according to one embodiment of the present invention.

FIG. 17 is a cross-sectional diagram of a lens system 150 according to an embodiment of the present invention. The lens system 150 includes an objective lens 152 and the lens 20 of the present invention. The lens 20 depicted in FIG. 17 is similar to the ISIL 20 illustrated in FIG. 4, although according to other embodiments, the lens 20 may be similar to the lenses 20 of FIGS. 5–8, including multiple focusing portions 32. For an embodiment in which the lens 20 is an ISIL as illustrated in FIG. 4, the lens 20 may be fabricated from a GRIN optical material. For the lens system 150 of FIG. 17, the light 154 incident on the upper surface 26 of the lens 20 need not be collimated. For an embodiment in which the lens 20 is hemispherical in shape, the lens 20 may provide additional focusing of the light 154.

Although the present invention has been described herein with respect to certain embodiment, those of ordinary skill in the art will recognize that many modifications and variations of the present invention may be implemented. The foregoing description and the following claims are intended to cover all such modifications and variations. Furthermore, the materials and processes disclosed are illustrative, but are not exhaustive. Other materials and processes may also be used to make devices embodying the present invention. In addition, the described sequences of the processing may also be varied.

What is claimed is:

1. An optical waveguide, comprising:
   a first cladding layer;
   a second cladding layer, wherein the first and second cladding layers define an optical channel; and
   a lens disposed in the optical channel of the waveguide, the lens including:
   a first focusing portion having a first refractive index, wherein the first focusing portion includes a focusing surface and a second surface; and
   a second focusing portion having an aspherical focusing surface and a second surface, wherein the aspherical focusing surface of the second focusing portion is connected to the second surface of the first focusing portion, wherein the second focusing portion has a second refractive index which is not equal to the first refractive index, such that collimated light incident on the focusing surface of the first focusing portion is focused in a near-field region of the second surface of the second focusing portion.

2. The optical waveguide of claim 1, wherein the lens is a mode-index waveguide lens.

3. The optical waveguide of claim 1, further comprising a collimating optics system disposed in the optical channel for producing the collimated light incident on the focusing surface of the first focusing portion.

4. The optical waveguide of claim 3, wherein the optical channel is for focusing thermal energy on a portion of a data layer of a data storage medium.

5. The optical waveguide of claim 1, wherein the optical channel is for focusing thermal energy on a portion of a data layer of a data storage medium.

6. The optical waveguide of claim 5, wherein the optical channel is adjacent to a magnetoresistive sensor.

7. The optical waveguide of claim 6, wherein the thermal energy is supplied to the optical channel from an optic fiber.

8. The optical waveguide of claim 6, wherein the thermal energy is supplied to the optical channel from a laser diode.

9. The optical waveguide of claim 1, wherein the second focusing portion of the lens disposed in the optical channel of the waveguide is directly connected to the first focusing portion.

10. The optical waveguide of claim 1, wherein the lens further includes a third focusing portion connected between the first and second focusing portions, wherein the third focusing portion has a third refractive index which is unequal to both the first and second refractive indices.

11. The optical waveguide of claim 1, wherein:
the second surface of the second focusing portion defines a cavity;
the lens disposed in the optical channel further includes a third focusing portion connected to the second focusing portion, wherein the third focusing portion has a high refractive index relative to a wavelength of the collimated light.

12. The optical waveguide of claim 11, wherein the third focusing portion has an optical thickness of less than one hundred wavelengths.

13. The optical waveguide of claim 12, wherein the third focusing portion has an optical thickness of less than ten wavelengths.

14. The optical waveguide of claim 11, wherein the third focusing portion includes a material having a refractive index greater than 2.6 relative to the wavelength of the collimated light.

15. The optical waveguide of claim 14, wherein the third focusing portion includes a material having a refractive index greater than 2.8 relative to the wavelength of the collimated light.

* * * * *

UNITED STATES PATENT AND TRADEMARK OFFICE
CERTIFICATE OF CORRECTION

PATENT NO.     : 6,594,430 B1
DATED          : July 15, 2003
INVENTOR(S)    : Rausch et al.

It is certified that error appears in the above-identified patent and that said Letters Patent is hereby corrected as shown below:

Column 1,
Line 67, delete "SIL 20" and substitute therefor -- SIL 12 --.

Column 2,
Line 19, delete "an" and substitute therefor -- a --.
Line 52, delete "yield" and substitute therefor -- yields --.

Column 5,
Line 32, after "may", insert -- be --.

Column 7,
Line 63, delete "been" and substitute therefor -- be --.

Column 8,
Line 11, delete "waveguide 100" and substitute therefor -- waveguide 110 --.
Line 24, substitute "collimating optical system 18" and substitute therefor -- collimating optical system 118 --.

Column 9,
Line 17, delete "flux-field" and substitute therefor -- flux field --.

Signed and Sealed this

Fourth Day of May, 2004

JON W. DUDAS
*Acting Director of the United States Patent and Trademark Office*